(12) United States Patent
Homma et al.

(10) Patent No.: US 9,146,676 B2
(45) Date of Patent: Sep. 29, 2015

(54) METHOD AND APPARATUS FOR NOTIFYING A USER ABOUT A MANIPULATION REGION ON THE BACK SURFACE OF THE APPARATUS

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 13/416,521

(22) Filed: Mar. 9, 2012

(65) Prior Publication Data
US 2012/0236022 A1    Sep. 20, 2012

(30) Foreign Application Priority Data
Mar. 17, 2011    (JP) .................... 2011-059387

(51) Int. Cl.
G06F 3/048    (2013.01)
G06F 3/0488    (2013.01)
G06F 1/16    (2006.01)

(52) U.S. Cl.
CPC .......... G06F 3/04886 (2013.01); G06F 1/1692 (2013.01); G06F 3/0488 (2013.01); G06F 3/04883 (2013.01)

(58) Field of Classification Search
CPC ... G06F 1/1601; G06F 1/1637; G06F 1/1647; G06F 17/30265; G06F 3/04886
See application file for complete search history.

(56) References Cited

U.S. PATENT DOCUMENTS

| | | | | |
|---|---|---|---|---|
| 5,327,161 A | * | 7/1994 | Logan et al. | 345/157 |
| 7,545,366 B2 | * | 6/2009 | Sugimoto et al. | 345/173 |
| 2003/0234768 A1 | * | 12/2003 | Rekimoto et al. | 345/169 |
| 2004/0189802 A1 | * | 9/2004 | Flannery | 348/143 |
| 2008/0055274 A1 | * | 3/2008 | Van Berkel et al. | 345/174 |
| 2009/0210829 A1 | * | 8/2009 | Giacomelli | 715/858 |

FOREIGN PATENT DOCUMENTS

JP    2007-334827    12/2007

OTHER PUBLICATIONS

Apple Inc., iPhone User Guide for iOS 4.2 Software, 2010, Apple, Inc., Cover page, p. 32, copyright page.*

* cited by examiner

*Primary Examiner* — Jennifer To
*Assistant Examiner* — Terri Filosi
(74) *Attorney, Agent, or Firm* — Paratus Law Group, PLLC

(57) ABSTRACT

A method is provided for generating notifications. The method comprises obtaining position information of an operating member. The method further comprises determining an operation area based on the position information. The method also comprises generating a notification when the determined operation area corresponds to an edge region of a surface of a device.

17 Claims, 13 Drawing Sheets

FIG. 1
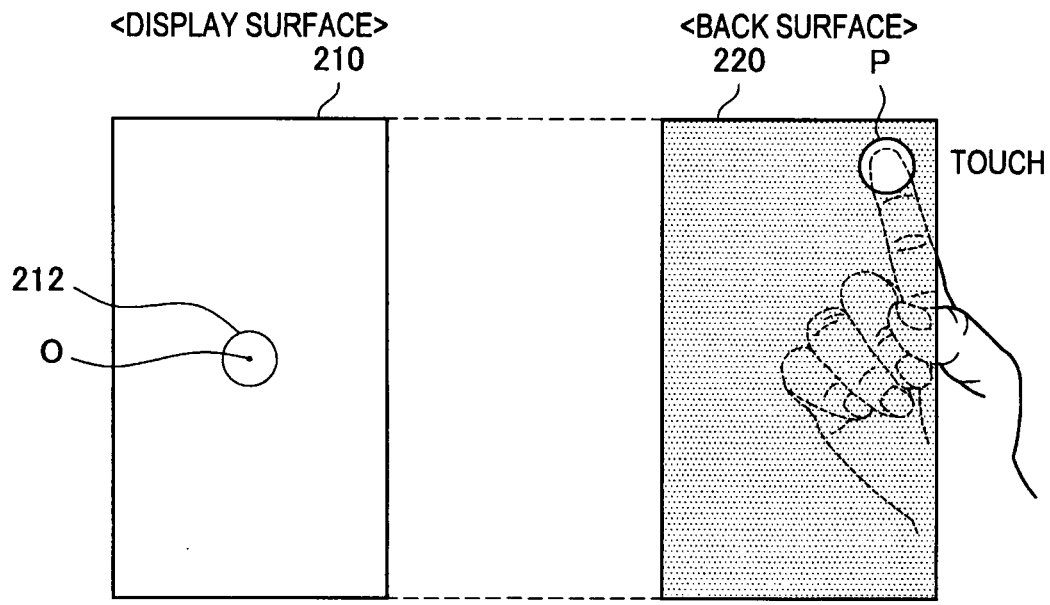
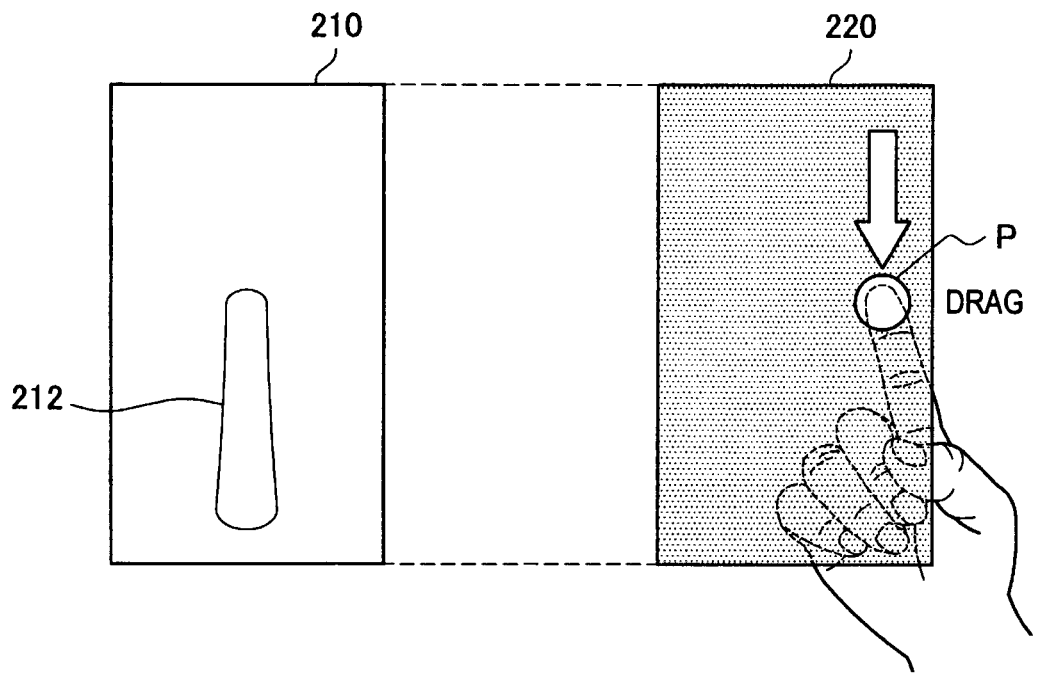

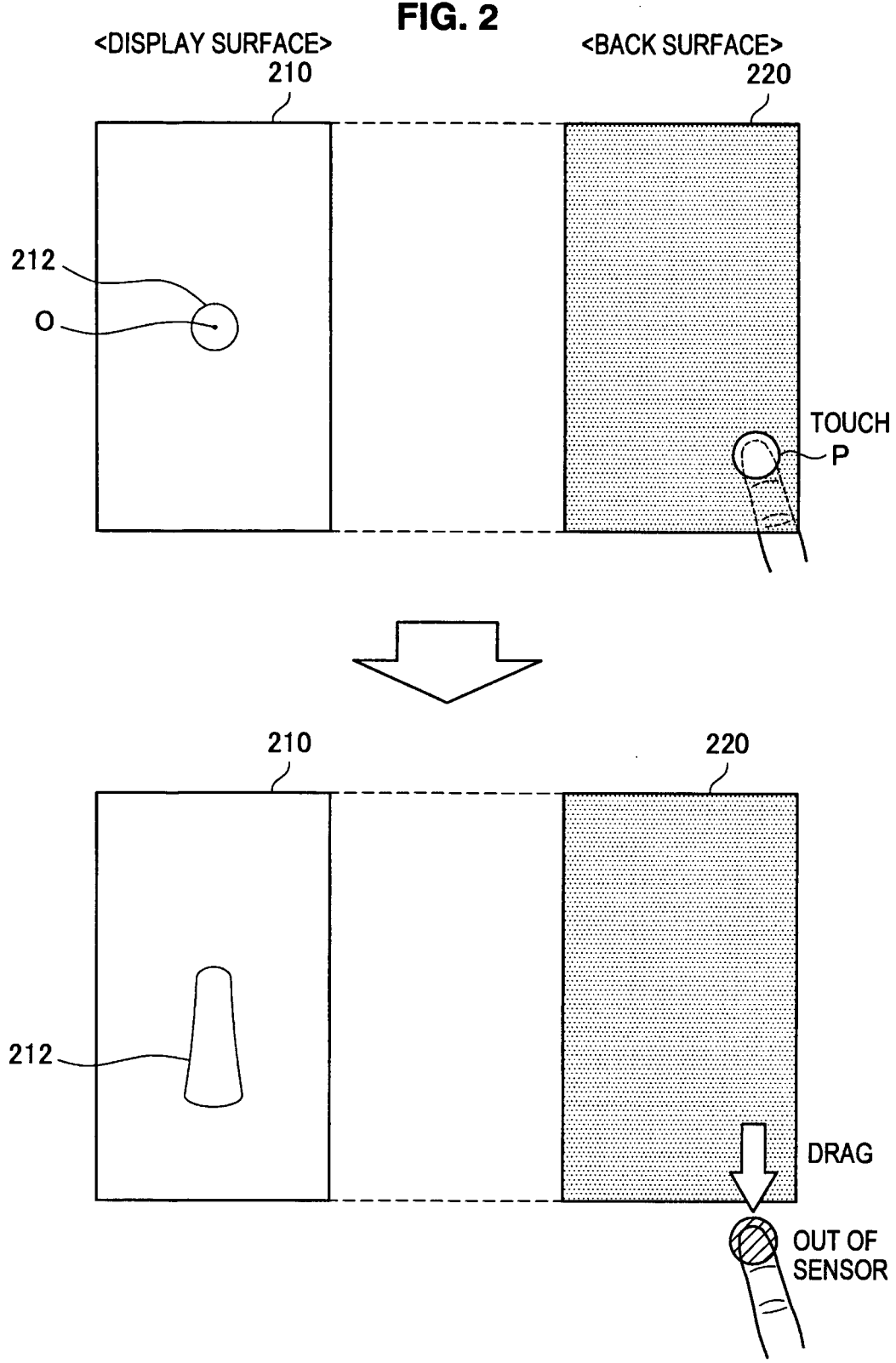

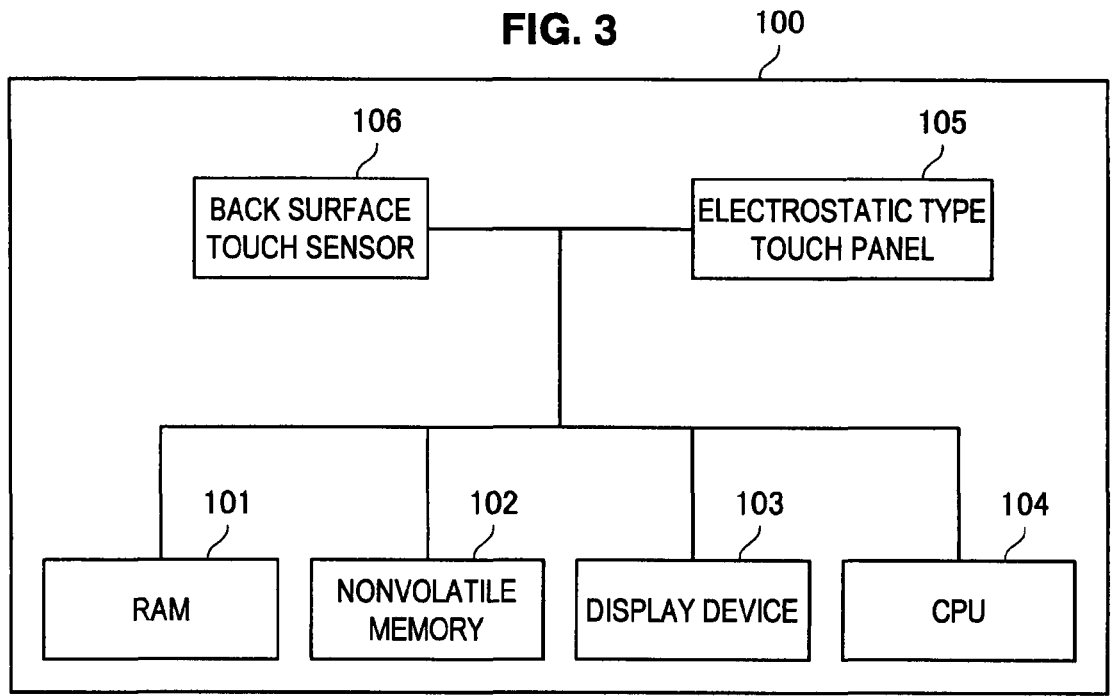
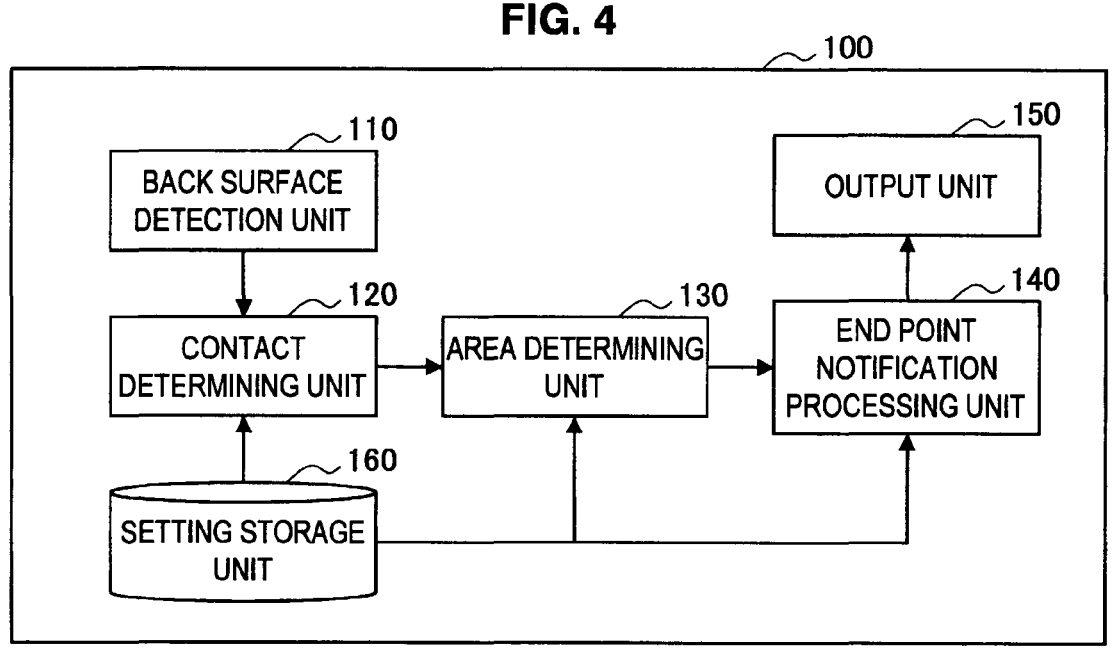

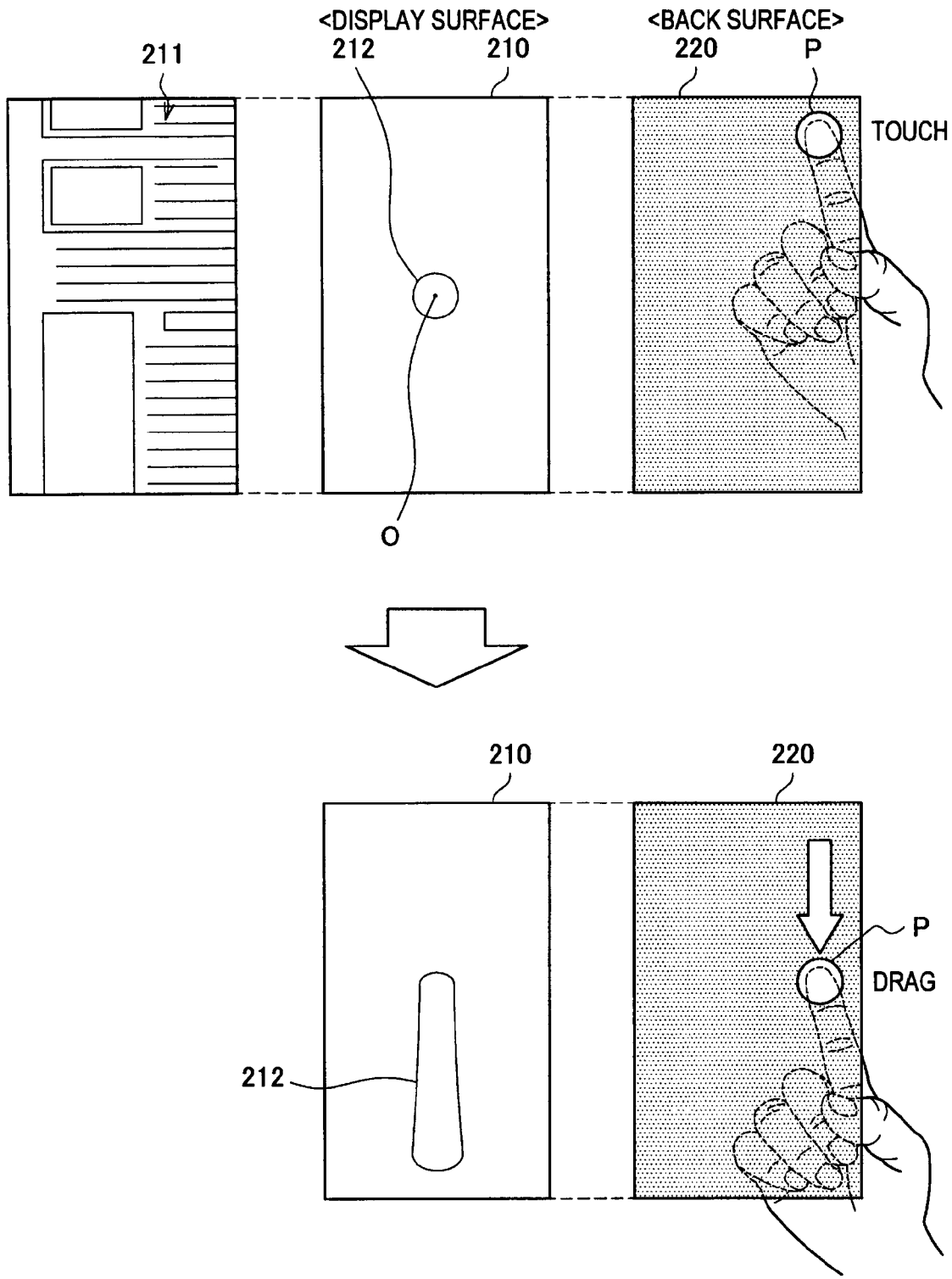

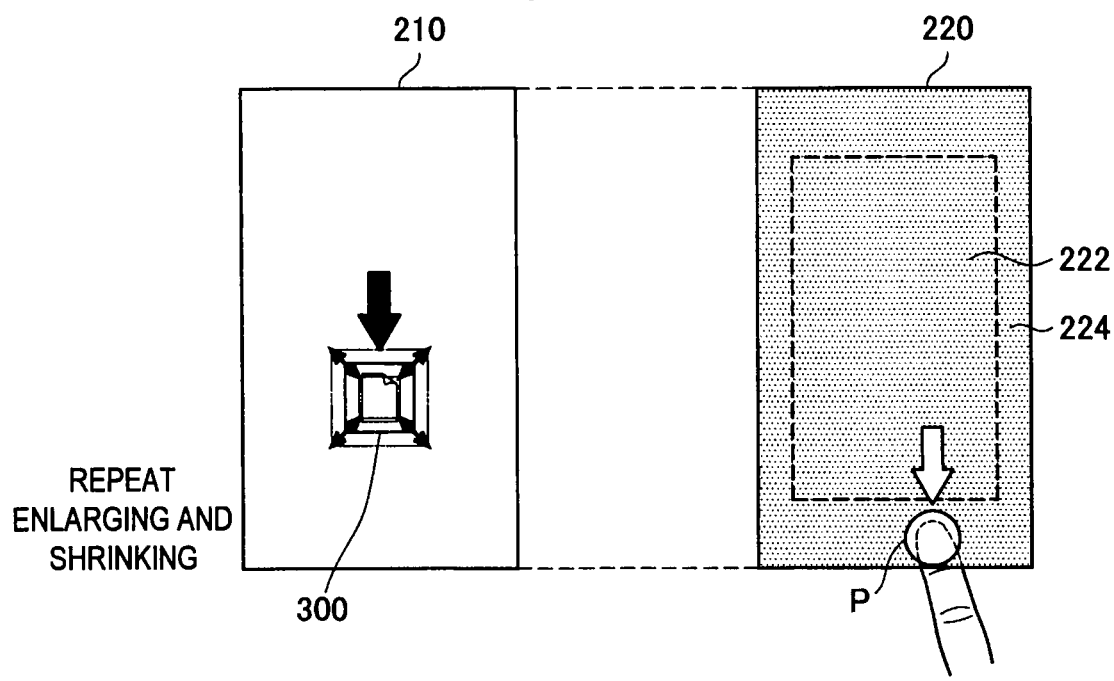
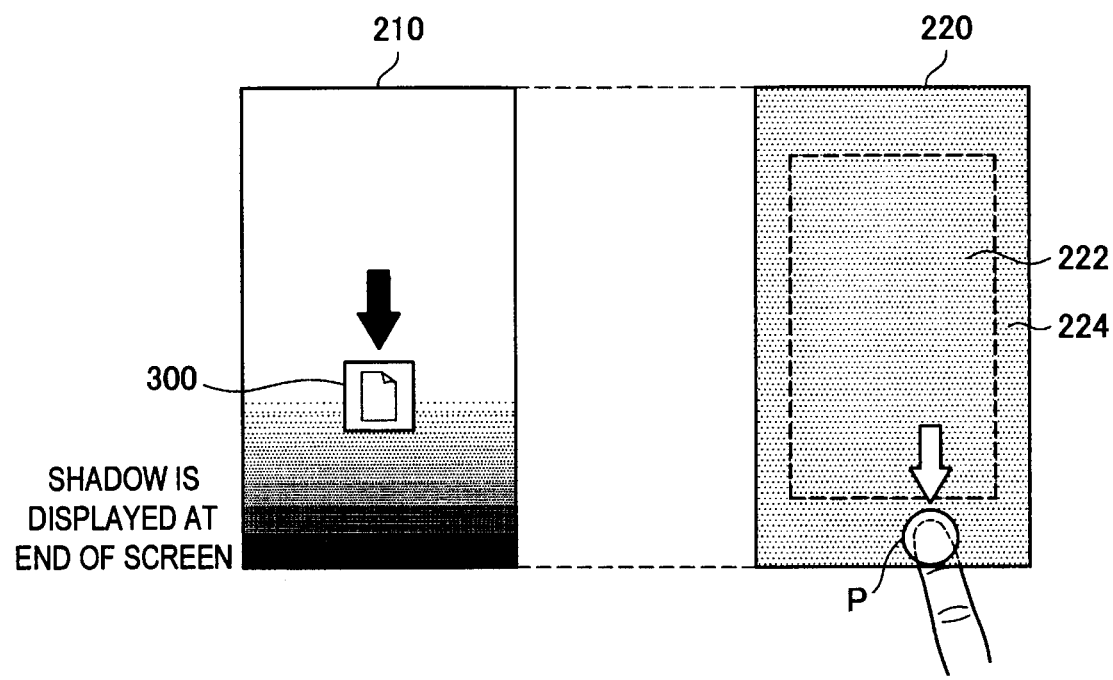

METHOD AND APPARATUS FOR NOTIFYING A USER ABOUT A MANIPULATION REGION ON THE BACK SURFACE OF THE APPARATUS

CROSS-REFERENCE TO RELATED APPLICATIONS

The present disclosure contains subject matter related to that disclosed in Japanese Priority Patent Application JP 2011-059387 filed in the Japan Patent Office on Mar. 17, 2011, the entire content of which is hereby incorporated by reference.

BACKGROUND

Description of the Related Art

The present disclosure relates to an information processing apparatus, an information processing method, and a computer-readable storage medium capable of detecting contact with a back surface at a side opposite to a display surface.

In recent years, an apparatus having a detection unit detecting contact with a manipulating object such as a finger on a back surface at a side opposite to a display surface has been suggested. For example, Japanese Patent Application Laid-Open No. 2007-334827 discloses a portable terminal apparatus that allows a user to operate a touch panel on the display surface from the back surface. The portable terminal apparatus 10 disclosed in Japanese Patent Application Laid-Open No. 2007-334827 includes a transparent flat display panel 20 and a transparent touch sensor 30 pasted to the back surface of the flat display panel 20. In the portable terminal apparatus 10, the flat display panel 20 and the touch sensor 30 are transparent, so that a touch position touched with a finger on the back surface can be seen, and a button 32 can be operated and selected while checking the touch position touched with the finger.

Technical Problem

In practice, however, the touch panel on the front surface and the touch sensor on the back surface tend to have different positions and sizes. In this case, it is difficult to apply the technique disclosed in Japanese Patent Application Laid-Open No. 2007-334827. For this reason, the method for visualizing operation on the back surface is mainly a method for offsetting the position touched with a manipulating object on the back surface as if the manipulating object touches the center of the display screen at all times and moving an object at the center of the display screen in accordance with relative coordinate movement therefrom.

In such a method, however, the position touched on the back surface is displaced from a display position of an object manipulated on the display screen, and when the user keeps on dragging the object to move the object, the user is less likely to notice that the finger on the back surface moves beyond the touch sensor. As a result, a termination processing is performed, e.g., an indicator representing a manipulated object suddenly disappears, without the user expecting it, and this makes it difficult for the user to manipulate the object on the display screen.

Therefore, it is desirable to provide a novel and improved information processing apparatus, information processing method, and computer-readable storage medium capable of notifying the user that the manipulating object on the back surface has moved out of the region in which the manipulation target can be manipulated.

SUMMARY

Accordingly, there is provided an apparatus for generating notifications. The apparatus comprises a processing unit configured to obtain position information of an operating member. The apparatus further comprises an area determination unit configured to determine an operation area of the apparatus based on the position information. The apparatus further comprises an edge notification unit configured to generate a notification when the determined operation area corresponds to an edge region of a surface of the apparatus.

In another aspect, there is provided a method for generating notifications. The method comprises obtaining position information of an operating member. The method further comprises determining an operation area based on the position information. The method also comprises generating a notification when the determined operation area corresponds to an edge region of a surface of a device.

In another aspect, there is provided a tangibly-embodied non-transitory computer-readable storage medium storing instructions which, when executed by a processor, cause a computer to perform a method for generating notifications. The method comprises obtaining position information of an operating member. The method further comprises determining an operation area based on the position information. The method also comprises generating a notification when the determined operation area corresponds to an edge region of a surface of a device.

In yet another aspect, there is provided an apparatus for generating notifications. The apparatus comprises processing means for obtaining position information of an operating member. The apparatus further comprises area determining means for determining an operation area of the apparatus based on the position information. The apparatus also comprises edge notifying means for generating a notification when the determined operation area corresponds to an edge region of a surface of the apparatus.

According to the embodiments described above, there are provided an information processing apparatus, information processing method, and computer-readable storage medium, for notifying a user that the manipulating object on the back surface has moved out of the region in which the manipulation target can be manipulated.

BRIEF DESCRIPTION OF THE DRAWINGS

FIG. 1 is an explanatory diagram illustrating an example of end point notification processing performed by an information processing apparatus according to a first embodiment of the present disclosure;

FIG. 2 is an explanatory diagram illustrating an example of situation to be solved by the information processing apparatus according to the embodiment;

FIG. 3 is a block diagram illustrating an example of hardware configuration of the information processing apparatus according to the embodiment;

FIG. 4 is a functional block diagram illustrating a functional configuration of the information processing apparatus according to the embodiment;

FIG. 5 illustrates an example of an indication displayed on a display surface by the information processing apparatus according to the embodiment;

FIG. 17 is an explanatory diagram illustrating still another example of the end point notification expression according to the embodiment;

FIG. 18 is an explanatory diagram illustrating still another example of the end point notification expression according to the embodiment.

DETAILED DESCRIPTION OF THE EMBODIMENT(S)

Figure 6:
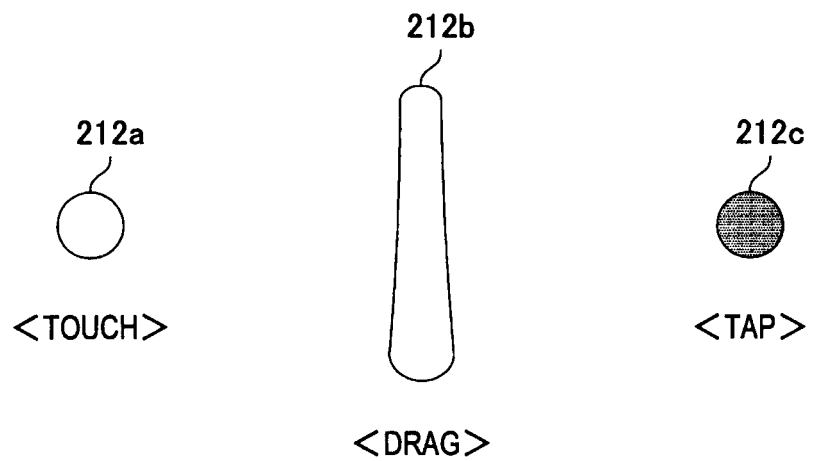
FIG. 6 is an explanatory diagram illustrating an example of a shape of an indicator changing according to manipulation/input.

In the following, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the description is set forth below in accordance with the following order.
1. First embodiment (drag operation of display content)
1-1. Overview of processing of information processing apparatus
1-2. Example of hardware configuration of information processing apparatus
1-3. Functional configuration of information processing apparatus
1-4. Example of screen configuration
1-5. End point notification processing
2. Second embodiment (drag and drop operation of existing object)

1. First Embodiment

1-1. Overview of Processing of Information Processing Apparatus

First, overview of processing performed by an information processing apparatus according to the first embodiment of the present disclosure will be explained with reference to FIGS. 1 and 2. It should be noted that FIG. 1 is an explanatory diagram illustrating an example of end point notification processing performed by the information processing apparatus according to the first embodiment of the present disclosure. FIG. 2 is an explanatory diagram illustrating an example of situation to be solved by the information processing apparatus according to the present embodiment.

The information processing apparatus according to the present embodiment is provided on an apparatus having a detection unit, detecting a manipulating object (i.e., an operating member, such as a finger) coming into contact with, or non-contacting proximity to, a side opposite to a display surface. When the manipulating object comes into contact with, or within non-contacting proximity to, the back surface, the information processing apparatus according to the present embodiment displays, on the display surface, an indicator indicating operation performed with respect to the position of the contact or the position of the manipulating object placed in non-contacting proximity. When a user sees the indicator displayed on the display surface, the user can recognize a situation of operation on the back surface. In the explanation about the present embodiment, a finger is used as an example of the manipulating object with which manipulation/input is performed. However, the present technique is not limited to the above example. Additionally, the term "contact position" expressly includes both a position of a manipulating object in actual contact with the surface, or a position of the manipulating object in non-contacting proximity to the surface.

For example, as shown in FIG. 1, when the user contacts (touches) any position of a back surface 220, an indicator 212 is displayed at a center O of a display surface 210 regardless of a contact position P. Then, when the user moves and drags a finger in any direction from the initial contact position while the user keeps the finger in contact therewith, the indicator 212 of the display surface 210 extends in a dragging direction from the center O. In this manner, the indicator 212 is made into a shape made by connecting the view point and the current position, so that the user is notified that the drag operation is being performed.

In this case, in the present embodiment, the absolute coordinate of the back surface 220 may not be obtained. Therefore, regardless of the initial contact position on the back surface 220, the indicator 212 is displayed in the center O of the display surface 210. For this reason, as shown in FIG. 2, even when the finger first comes into contact with a position close to an edge of the back surface 220, the indicator 212 is initially displayed at the center O of the display surface 210 like the case of FIG. 1. Thereafter, when the finger is moved on the back surface 220, and the finger is moved to a region in which there is no sensor detecting the finger coming into contact with the back surface 220, the indicator 212 may not change from the state of display which reminds the user that the indicator 212 appears to be still movable within the display surface 210 as shown in FIG. 2. To prevent this, the information processing apparatus according to the present embodiment gives end point notification so that the user can recognize that the finger is likely to move out of a region in which the sensor is provided, and this improves the ease of operation.

1-2. Example of Hardware Configuration of Information Processing Apparatus

FIG. 3 shows an example of hardware configuration of the information processing apparatus according to the present embodiment. As shown in FIG. 3, the information processing apparatus 100 according to the present embodiment includes a RAM (Random Access Memory) 101, a tangibly-embodied non-transitory computer-readable storage medium, such as a nonvolatile memory 102, a display device 103, a CPU 104, an electrostatic type touch panel 105, and a back surface touch sensor 106.

The RAM 101 temporarily stores programs used during execution of the CPU 104 and parameters and the like that change as necessary during the execution. These are connected with each other by a host bus constituted by a CPU bus and the like. The nonvolatile memory 102 stores instructions, programs, operational parameters, and the like executed by the CPU 104. The nonvolatile memory 102 may be, for example, a ROM (Read Only Memory) or a flash memory.

The display device 103 is an example of an output device for outputting information. The display device 103 may be, for example, a liquid crystal display (LCD) device and an OLED (Organic Light Emitting Diode) device. The CPU 104 functions as an arithmetic processing unit and a control device, so as to control overall operation in the information processing apparatus 100 according to various kinds of programs or instructions, such as instructions stored in nonvolatile memory 102. The CPU 104 may be a microprocessor.

The electrostatic type touch panel 105 is provided as being laminated on the display surface of the display device, and detects a manipulating object, such as a finger coming into contact therewith, or by detecting non-contacting proximity of the manipulating object, by sensing an electric signal based on static electricity. In the information processing apparatus 100 according to the present embodiment, the electrostatic type touch panel is used. However, instead of the electrostatic type touch panel 105, a pressure-sensitive touch panel detecting a finger coming into contact therewith by sensing change in pressure applied to the display surface may be used. The back surface touch sensor 106 is an example of an input device with which a user inputs information. The back surface touch sensor 106 is provided on the back surface at the side opposite to the display surface. The back surface touch sensor 106 includes, for example, an input unit for inputting information and an input control circuit generating an input signal based on input given by a user and outputting the input signal to the CPU 104.

1-3. Functional Configuration of Information Processing Apparatus

Subsequently, a functional configuration of the information processing apparatus 100 according to the present embodiment will be explained with reference to FIG. 4. FIG. 4 is a functional block diagram illustrating the functional configuration of the information processing apparatus 100 according to the present embodiment.

As shown in FIG. 4, the information processing apparatus 100 according to the present embodiment includes a back surface detection unit 110, a contact determining unit 120, an area determining unit 130, an end point notification processing unit 140, an output unit 150, and a setting storage unit 160. As used herein the term "unit" may be a software module, a hardware module, or a combination of a software module and a hardware module. Such hardware and software modules may be embodied in discrete circuitry, an integrated circuit, or as instructions executed by a processor.

The back surface detection unit 110 is a detection unit provided at the side opposite to the display surface, and corresponds to a back surface touch sensor 106 of FIG. 3. The back surface detection unit 110 detects manipulation/input for manipulating a display content on the display surface. In the present embodiment, the state of contact of the finger with the back surface 220 is determined based on detection result provided by the back surface detection unit 110. Then, which of manipulations, e.g., touch, tap, and drag, is given by the user is identified based on the determination result, and the display content on the display surface is changed according to the manipulation/input. When a finger touches the back surface 220, the back surface detection unit 110 outputs a predetermined contact detection signal to the contact determining unit 120.

It is to be appreciated that while the following example embodiment discusses a finger touching or otherwise contacting the back surface 220, the predetermined contact detection signal generated by the back surface detection unit 110 can be based on detecting non-contacting proximity of an operating member, such as a finger, to the back surface 220.

The contact determining unit 120 (i.e., a processing unit) determines whether the finger has come into contact with the back surface 220 or not based on the contact detection signal provided by the back surface detection unit 110. When the contact determining unit 120 detects an input of the contact detection signal from the back surface detection unit 110, the contact determining unit 120 determines that the finger is in contact with the back surface 220. In cases other than the above, the contact determining unit 120 determines that the finger is not in contact with the back surface 220. The contact determining unit 120 performs contact determination processing in predetermined timing, and outputs the determination result to the area determining unit 130.

The area determining unit 130 determines an operation area or region to which the contact position of the finger currently belongs, based on the determination result of the contact determining unit 120. As explained later, the back surface detection unit 110 is classified into a central area, i.e., a central portion of the back surface detection unit 110, and an edge area, i.e., a peripheral portion of the back surface detection unit 110, located around the central area. The central area is a region in which contact of a finger can be detected without the finger moving out of the region in which the back surface detection unit 110 is provided (the installation region of the back surface detection unit 110) even if the finger moves some distance (i.e., the detectable region by the back surface detection unit 110). On the other hand, the edge area is a region where the finger is likely to move out of the installation region of the back surface detection unit 110 when the finger is further moved. The area determining unit 130 determines which of the central area and the edge area the finger is located based on the determination result provided by the contact determining unit 120, and outputs the determination result to the end point notification processing unit 140.

When the finger is determined to be likely to move out of the region in which the back surface detection unit 110 is provided based on the determination result of the area determining unit 130, the end point notification processing (i.e., edge notification) unit 140 performs processing for notifying the user to that effect (end point notification processing). For example, when the notification to the user is given by means of display, the end point notification processing unit 140 commands a display unit (output unit 150) to display a notification indicating that the finger may move out of the installation region of the back surface detection unit 110. For example, when the notification to the user is given by means of sound, the end point notification processing unit 140 commands an audio output unit (output unit 150) to output a sound indicating that the finger may move out of the installation region of the back surface detection unit 110.

The output unit 150 outputs notification information indicating that the finger may move out of the installation region of the back surface detection unit 110. The output unit 150 may be, for example, the display unit for displaying information or the audio output unit such as a speaker for outputting sound. The output unit 150 outputs the notification information according to the notification command given by the end point notification processing unit 140.

The setting storage unit 160 stores information used to execute notification processing for notifying the user that the manipulating object may move out of the installation region of the back surface detection unit 110. Information stored in the setting storage unit 160 includes, for example, information for determining which of the central area and the edge area of the back surface detection unit 110 the finger is located, and a notification method used when the finger may move out of the installation region of the back surface detection unit 110. The setting storage unit 160 may store the above information in advance, or can store information input by a user. The contact determining unit 120, the area determining unit 130, and the end point notification processing unit 140 can access the setting storage unit 160 as necessary to obtain predetermined information.

1-4. Example of Screen Configuration

In the information processing apparatus 100 according to the present embodiment, the display surface 210 displays the indicator 212 indicating operation performed with respect to the contact position at which the finger is in contact with the back surface, so as to allow the user to recognize the situation of operation performed with the finger on the back surface 220. FIG. 5 illustrates an example of the indicator 212 displayed on the display surface 210 by the information processing apparatus 100 according to the present embodiment.

The display surface 210 displays the display content 211 such as pictures, motion pictures, texts, and web contents. The display content 211 can be moved according to movement of the finger coming into contact with the back surface 220. The display surface 210 displays the display content 211 as well as the indicator 212 representing movement of the finger on the back surface 220. When the finger comes into contact with the back surface 220, the indicator 212 is displayed in the center O of the display surface 210 regardless of the contact position of the finger on the back surface 220.

While the finger is in contact with the back surface 220, the shape or form of the indicator 212 is changed according to the movement of the finger. For example, as shown in FIG. 5, when a user moves and drags a finger in a downward direction of FIG. 5 from the position touched on the back surface 220, the shape of the indicator 212 changes from a circular shape to a shape made by connecting the center O and the current finger position. Since the shape of the indicator 212 is thus changed, the user can recognize the movement of the finger, and this improves the ease of operation.

The shape of the indicator 212 is preferably a shape that allows the user to easily recognize the movement of the finger on the back surface 220. For example, as shown in FIG. 6, when the finger contacts (touches) the back surface 220, a circular indicator 212a may be displayed, and when the finger being in contact with the back surface 220 is moved and dragged, an indicator 212b having a shape made by connecting a start point (center O) and the current finger position may be displayed. During the drag operation, the indicator 212b may not be a shape made by connecting the start point and the end point with a straight line as shown in FIG. 6, and may be a shape obtained by tracing the movement of the finger.

When a tap operation is performed, i.e., the finger is brought into contact with the back surface 220 and then immediately released from the back surface, a circular indicator 212c in predetermined color may be displayed as shown in FIG. 6. As a result, even when indicators 212a having the same shape are displayed, the user can recognize difference of operation by the colors of the indicators 212. Alternatively, the indicator 212 may not be in any color, or may be in a transparent color, so that the indicator 212 does not reduce the visibility of the display content 211 on the display surface 210.

As described above, the information processing apparatus 100 changes the display shape of the indicator 212 on the display surface 210 in accordance with operations such as touch, drag, an tap. Then, the user executes predetermined processing while the user looks at the indicator 212. For example, the information processing apparatus 100 can perform operation such as scrolling a list displayed on the display surface 210 and moving a focus (i.e., selection) in the list in response to the drag operation performed by the user. In addition, for example, the information processing apparatus 100 can execute any action on a currently focused item in response to a tap operation.

Figure 7:
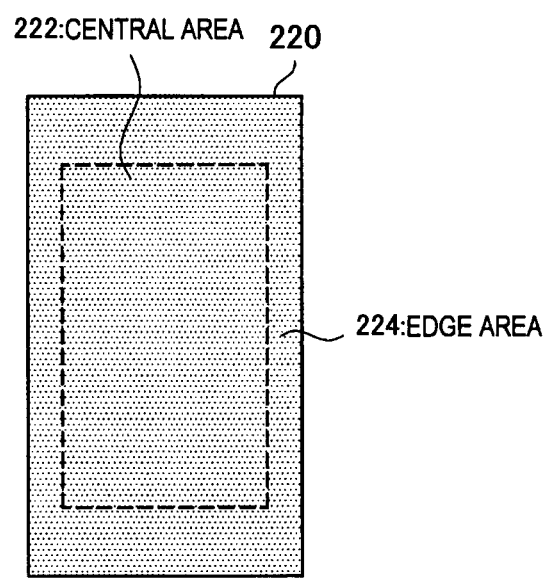
FIG. 7 is an explanatory diagram illustrating a central area and an edge area set in a back surface detection unit.

In this case, the information processing apparatus 100 according to the present embodiment can use the indicator 212 to notify the user that the finger is moving out of the installation region of the back surface detection unit 110. Accordingly, as shown in FIG. 7, the back surface detection unit 110 is classified into a central area 222, i.e., a central portion of the back surface detection unit 110, and an edge area 224, i.e., a peripheral portion of the central area 222, and the display form of the indicator 212 is changed according to the region where the finger is located. In the present embodiment, the classification between the central area 222 and the edge area 224 is set by software. However, the present technique is not limited to such example. The central area 222 and the edge area 224 may be set by providing different touch sensors in terms of hardware.

Figure 8:
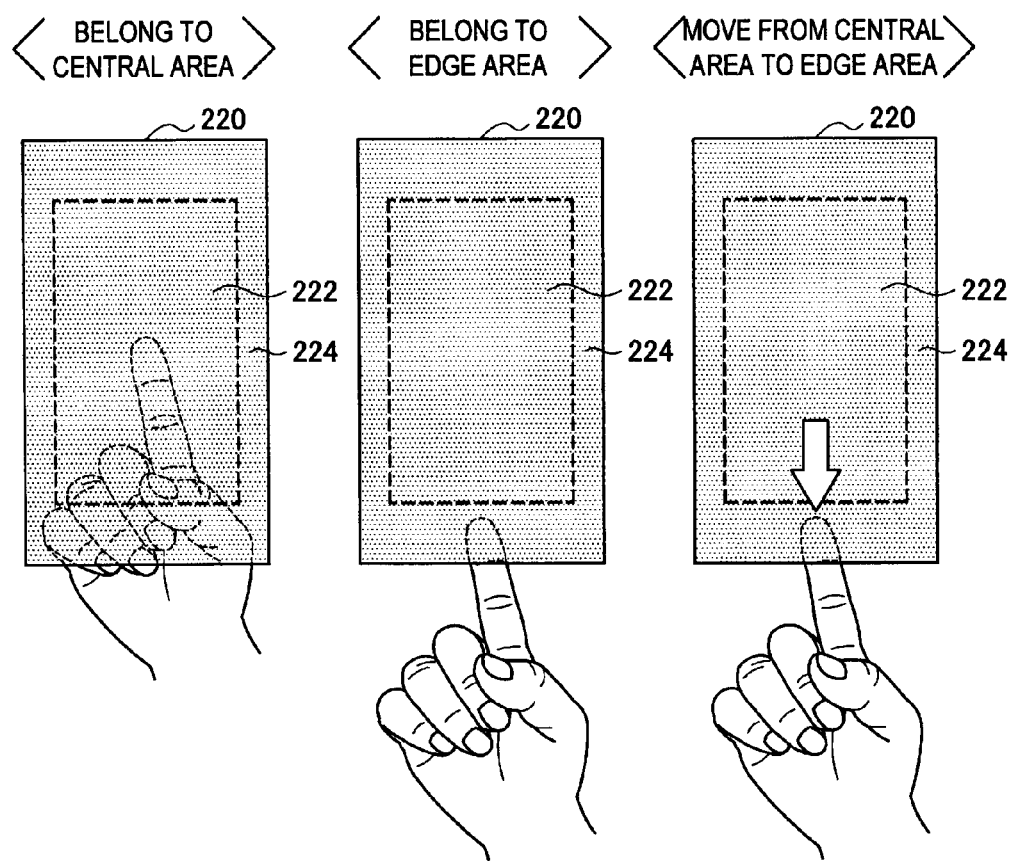
FIG. 8 is an explanatory diagram illustrating relationship between a contact position of a finger and each area of the back surface detection unit.

When the installation region of the back surface detection unit 110 is classified as shown in FIG. 7, the area to which the finger belongs can be defined as shown in FIG. 8 according to the position of the finger coming into contact with the back surface 220. For example, when the contact position of the finger is in the central area 222 of the back surface detection unit 110, the finger belongs to the central area 222. On the other hand, when the contact position of the finger is in the edge area 224 of the back surface detection unit 110, the finger belongs to the edge area 224. When the user moves the finger, the area to which the finger belongs changes from the central area 222 to the edge area 224 or from the edge area 224 to the central area 222.

The edge area 224 is provided at the periphery of the installation region of the back surface detection unit 110, and therefore, when the finger belongs to the edge area 224, the finger is likely to be moved out of the installation region of the back surface detection unit 110. Accordingly, when the finger belongs to the edge area 224, the information processing apparatus 100 according to the present embodiment changes the display form of the indicator 212 to notify the user that the finger may move out of the installation region of the back surface detection unit 110.

Figure 9:
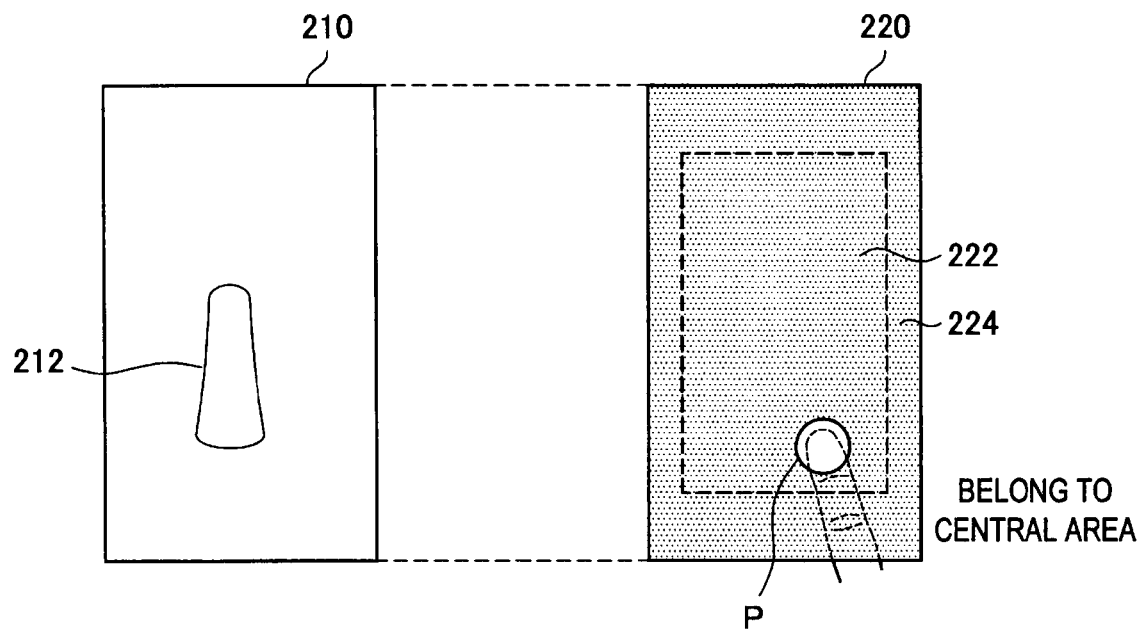
FIG. 9 is an explanatory diagram illustrating an example of display of an indicator when a finger belongs to a central area.
Figure 10:
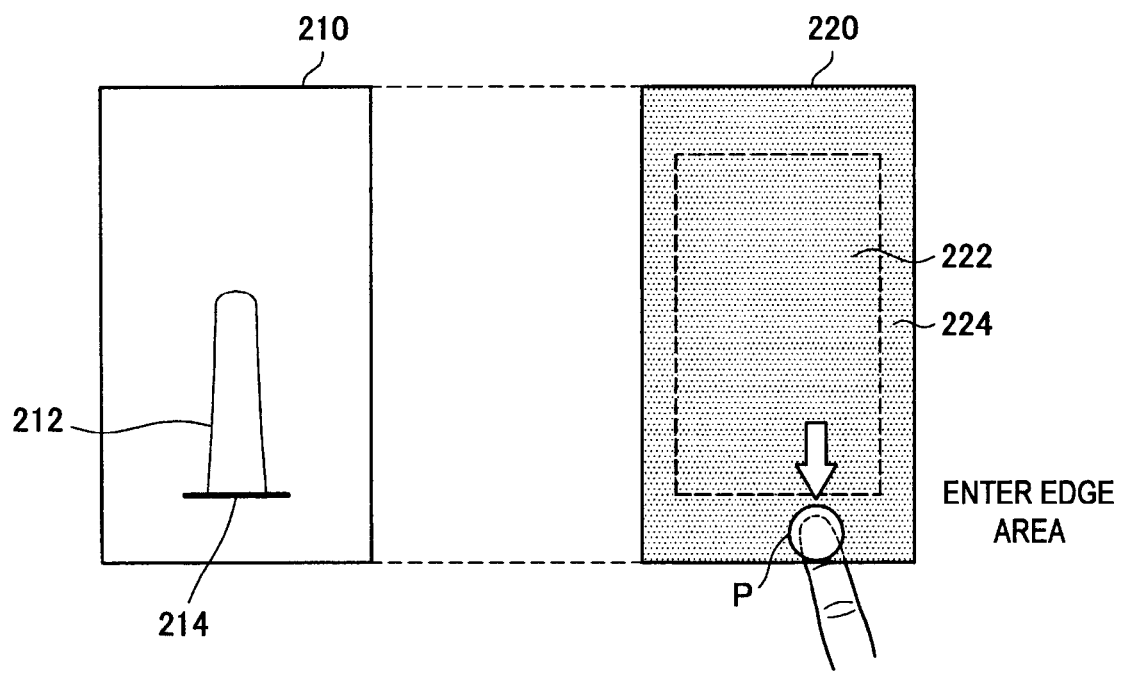
FIG. 10 is an explanatory diagram illustrating an example of display of an indicator when a finger belongs to an edge area.
Figure 11:
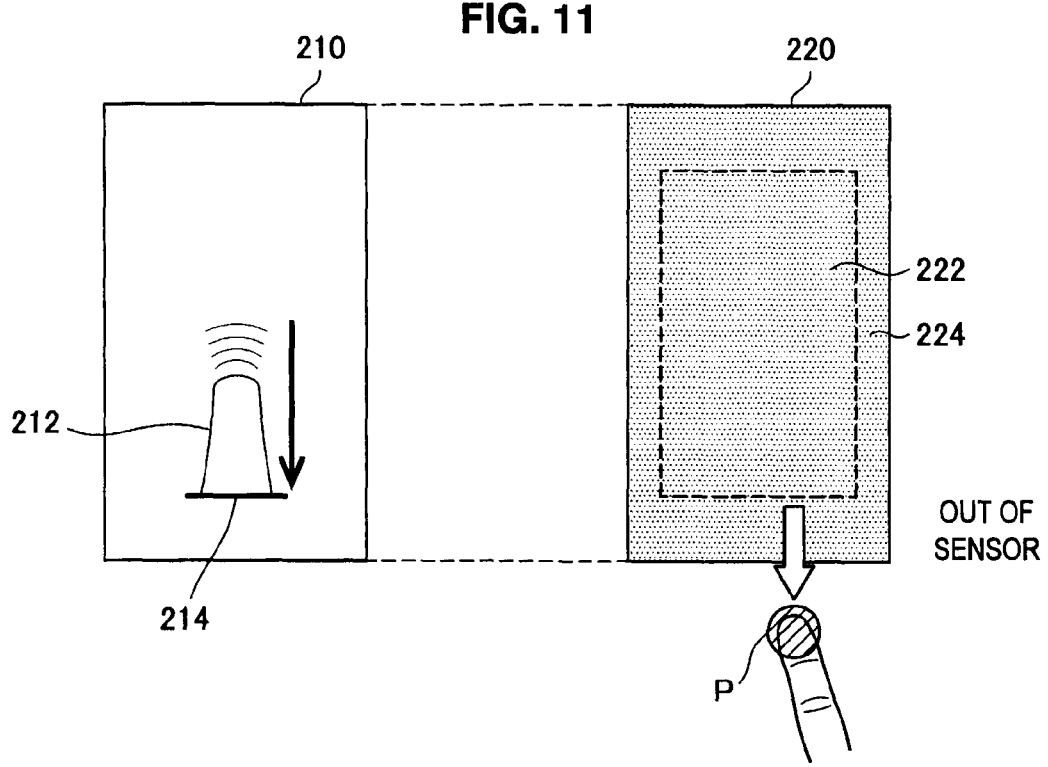
FIG. 11 is an explanatory diagram illustrating an example of display of an indicator when a finger moves out of an installation region in which the back surface detection unit is provided.
Figure 12:
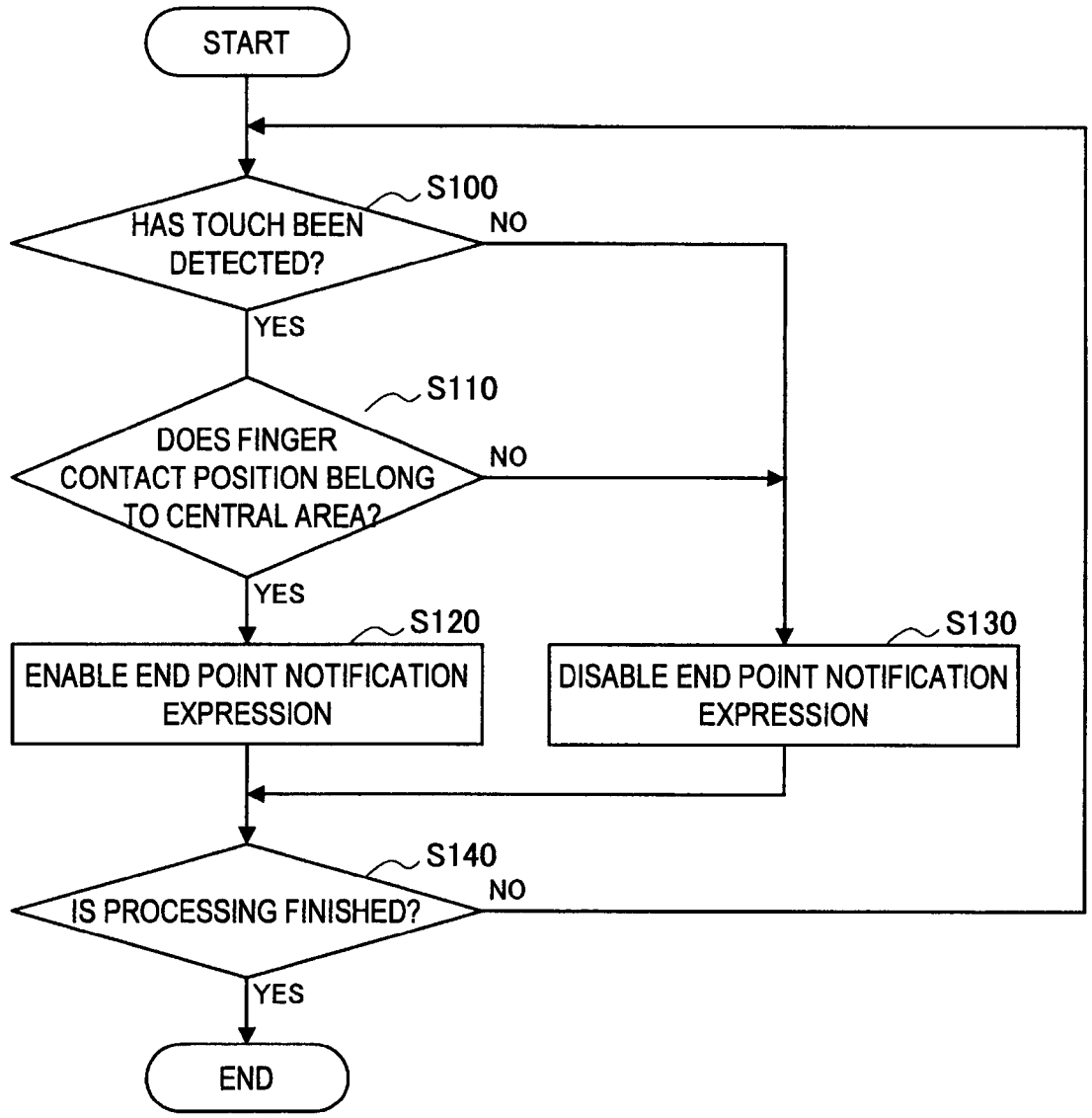
FIG. 12 is a flowchart illustrating end point notification processing performed by the information processing apparatus according to the embodiment.

The end point notification processing performed by the information processing apparatus 100 according to the present embodiment will be hereinafter explained with reference to FIGS. 9 to 12. FIG. 9 is an explanatory diagram illustrating an example of display of the indicator 212 when the finger belongs to the central area 222. FIG. 10 is an explanatory diagram illustrating an example of display of the indicator 212 when a finger belongs to the edge area 224. FIG. 11 is an explanatory diagram illustrating an example of display of the indicator 212 when a finger moves out of the installation region of the back surface detection unit 110. FIG. 12 is a flowchart illustrating end point notification processing performed by the information processing apparatus 100 according to the present embodiment.

1-5. End Point Notification Processing

In the end point notification processing performed by the information processing apparatus 100 according to the present embodiment, first, the contact determining unit 120 determines whether finger touch is detected or not based on the contact detection signal provided by the back surface detection unit 110 as shown in FIG. 12 (S100). When the finger is determined not to be in contact with the back surface 220 in step S100, the end point notification processing unit 140 disables end point notification expression (S130). On the other hand, when the finger is determined to be in contact with the back surface 220 in step S100, the area determining unit 130 determines whether the contact position of the finger belongs to the central area 222 (S110). When the contact position of the finger is determined not to belong to the central area 222, i.e., the contact position of the finger is determined to belong to the edge area 224 in step S110, the end point notification processing unit 140 disables the end point notification expression (S130).

On the other hand, when the contact position of the finger is determined to belong to the central area 222 in step S110, the end point notification processing unit 140 enables the end point notification expression (S120). Specific operation for enabling the end point notification expression is shown in FIGS. 9 to 11. When the contact position of the finger is determined to belong to the central area 222 in step S110, the indicator 212 displayed on the display surface 210 is displayed in a normal display form as shown in FIG. 6. For example, as shown in FIG. 9, when the finger is dragged in the central area 222, the indicator 212 is displayed in the shape made by connecting the start point and the end point along the movement of the finger.

Thereafter, it is assumed that the finger is further moved from the state as shown in FIG. 9, so that the contact position of the finger moves from the central area 222 into the edge area 224. At this occasion, the end point notification processing unit 140 of the information processing apparatus displays the indicator 212 in an expression as if the indicator 212 bumps into a wall 214 and is squashed as shown in FIG. 10, for example. When the indicator 212 is displayed in a state different from the normal state in this manner, the indicator 212 can intuitively notify the user that the finger on the back surface is likely to go out of the installation region of the back surface detection unit 110. This wall 214 may not be displayed on the display surface 210 (i.e., may be invisible to the user).

When the finger keeps on moving out of the installation region of the back surface detection unit 110 from the edge area 224 shown in FIG. 10, the indicator 212 may be displayed with animation as if the indicator 212 bumps into the wall 214 and is pulled into the wall 214, for example, as shown in FIG. 11. As a result, the size of the indicator 212 displayed on the display surface 210 gradually decreases, and the indicator 212 disappears from the display surface 210 after a predetermined period of time passes. As described above, the user can be intuitively notified that the finger has moved out of the installation region of the back surface detection unit 110.

It should be noted that when the finger moves back again into the back surface 220 to be in contact therewith from the outside of the installation region of the back surface detection unit 110 while the animation showing the indicator 212 pulled into the wall 214 is executed, such as within a predetermined time, the manipulation/input on the back surface 220 can be continuously performed. For example, when, during drag operation, the finger is brought into contact with the back surface detection unit 110 from the outside of the installation region of the back surface detection unit 110 as shown in FIG. 11, the user can keep on performing the same drag operation as that performed before the finger moves out of the installation region of the back surface detection unit 110. This prevents termination of executed processing due to the finger moving out of the installation region of the back surface detection unit 110, and prevents transition to a subsequent processing without the user expecting it.

When the contact position of the finger at which the user has initially brought a finger into contact with the back surface 220 is in the edge area 224, the circular indicator 212 as shown in FIG. 6 may be immediately changed to a squashed shape, for example. Therefore, the user can be intuitively notified that the finger is at a position where the finger is likely to move out of the installation region of the back surface detection unit 110.

Back to the explanation about FIG. 12, the end point notification expression is enabled in step S120, or the end point notification expression is disabled in step S130, and thereafter a determination is made as to whether the operation processing of the display content 211 on the display surface 210 based on the manipulation/input provided by the back surface detection unit 110 is to be terminated or not (S140). For example, when the executed application is terminated, or other processing is preferentially executed, the operation processing is determined to be terminated in step S140. On the other hand, when operation processing is determined to be continued in step S140, the processing starting from step S100 is repeated.

The notification processing of the state of operation on the back surface 220 performed by the information processing apparatus 100 according to the present embodiment has been hereinabove explained. According to the present embodiment, the display of the indicator 212 is changed in order to notify the user of the state of operation performed on the back surface 220 when the finger is moving out of the installation region of the back surface detection unit 110. As a result, the user who is looking at only the display surface 210 can be intuitively notified of the state of the finger with which the user performs manipulation/input operation on the back surface 220.

2. Second Embodiment

Figure 13:
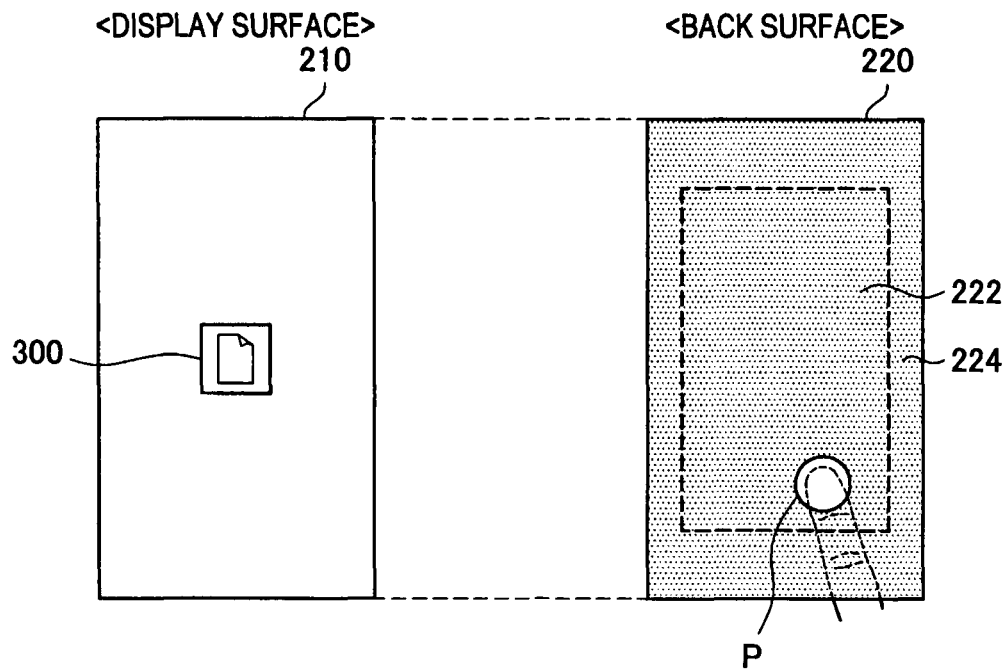
FIG. 13 is an explanatory diagram for explaining a target manipulated by a user in a second embodiment of the present disclosure.

Subsequently, end point notification expression of an information processing apparatus 100 according to the second embodiment of the present disclosure will be explained with reference to FIGS. 13 to 18. It should be noted that the information processing apparatus 100 according to the present embodiment has the same configuration and function as those of the information processing apparatus 100 according to the first embodiment of the present disclosure. When the information processing apparatus 100 according to the present embodiment is compared with that of the first embodiment, the end point notification expressions provided by the information processing apparatus 100 according to the present embodiment is different from that provided in the first embodiment. The end point notification expressions of the information processing apparatus 100 according to the present embodiment will be hereinafter explained. FIG. 13 is an explanatory diagram for explaining a target manipulated by a user in the second embodiment of the present disclosure. FIGS. 14 to 18 are explanatory diagrams illustrating examples of end point notification expressions according to the present embodiment.

In the present embodiment, as shown in FIG. 13, the user brings a finger into contact with the back surface 220 and moves the finger thereon, and accordingly an icon 300 displayed on the display surface 210 is moved. The user can move the icon 300 displayed on the display surface 210 in any direction by bringing the finger into contact with the back surface 220 and moving the finger in any direction, but when the finger moves out of the back surface detection unit 110, the icon 300 can no longer be moved. When the icon 300 is defocused (i.e., deselected), the user has to perform manipulation/input operation again in order to move the icon 300. Accordingly, in the present embodiment, when the finger on the back surface 220 with which the icon 300 is moved is moving out of the installation region of the back surface detection unit 110, the state of display of the icon 300 is changed (i.e., end point notification expression), so that the user is intuitively notified of the situation. Furthermore, the focus may remain on the previously moved icon for a predetermined amount of time, enabling a user to move the finger back into the installation region of the back surface detection unit 110, and continue moving the icon.

Figure 14:
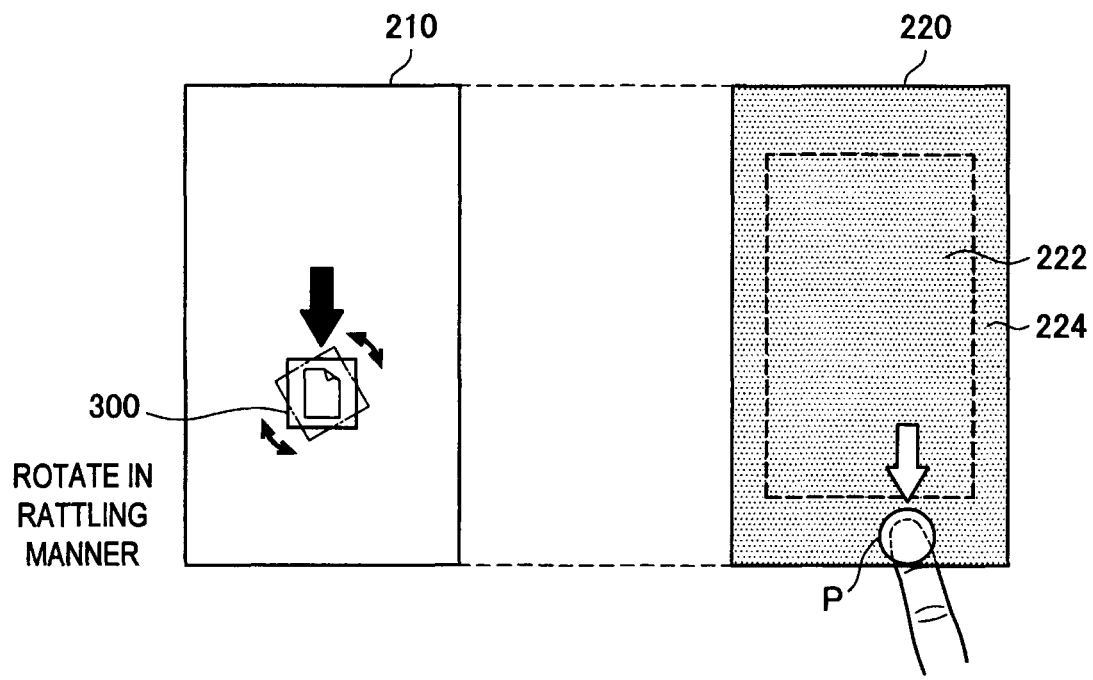
FIG. 14 is an explanatory diagram illustrating an example of an end point notification expression according to the embodiment.

Unlike the indicator 212 of the first embodiment, the shape of the existing object such as the icon 300 serving as the manipulation target of the present embodiment may not be changed according to the contact position of the finger. In this case, when the existing object is dragged and dropped, and the icon 300 of the manipulation target moves from the central area 222 of the back surface detection unit 110 into the edge area 224, the icon 300 of the manipulation target is rotated in a rattling manner as shown in FIG. 14, for example. As a result, when the finger moves into the edge area 224, the icon 300 which has not been rotating until then starts to rotate, and this change in the movement of the icon 300 allows the user to intuitively recognize that the finger is moving out of the installation region of the back surface detection unit 110.

Figure 15:
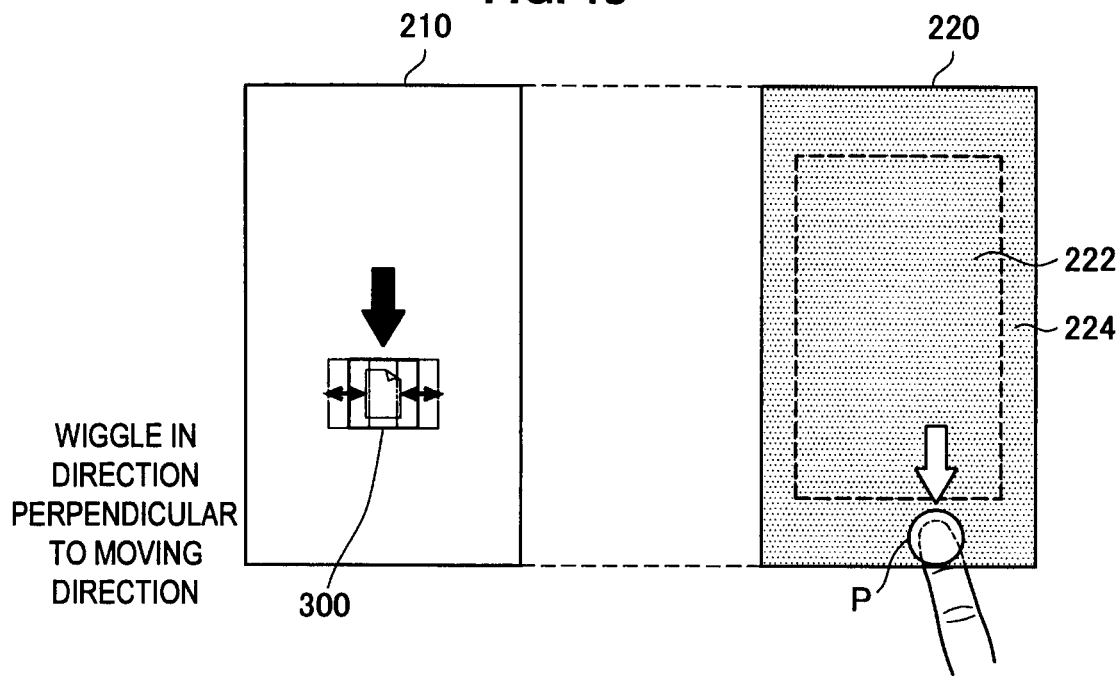
FIG. 15 is an explanatory diagram illustrating another example of the end point notification expression according to the embodiment.

Another end point notification expression may be displayed as follows. For example, as shown in FIG. 15, when the finger with which the icon 300 of the manipulation target is manipulated moves from the central area 222 of the back surface detection unit 110 into the edge area 224, the icon 300 wiggling in a direction perpendicular to the direction in which the icon 300 moves may be displayed. As a result, when the finger moves into the edge area 224, the icon 300 which has not been wiggling until then starts to wiggle, and this change in the movement of the icon 300 allows the user to intuitively recognize that the finger is moving out of the installation region of the back surface detection unit 110.

Figure 16:
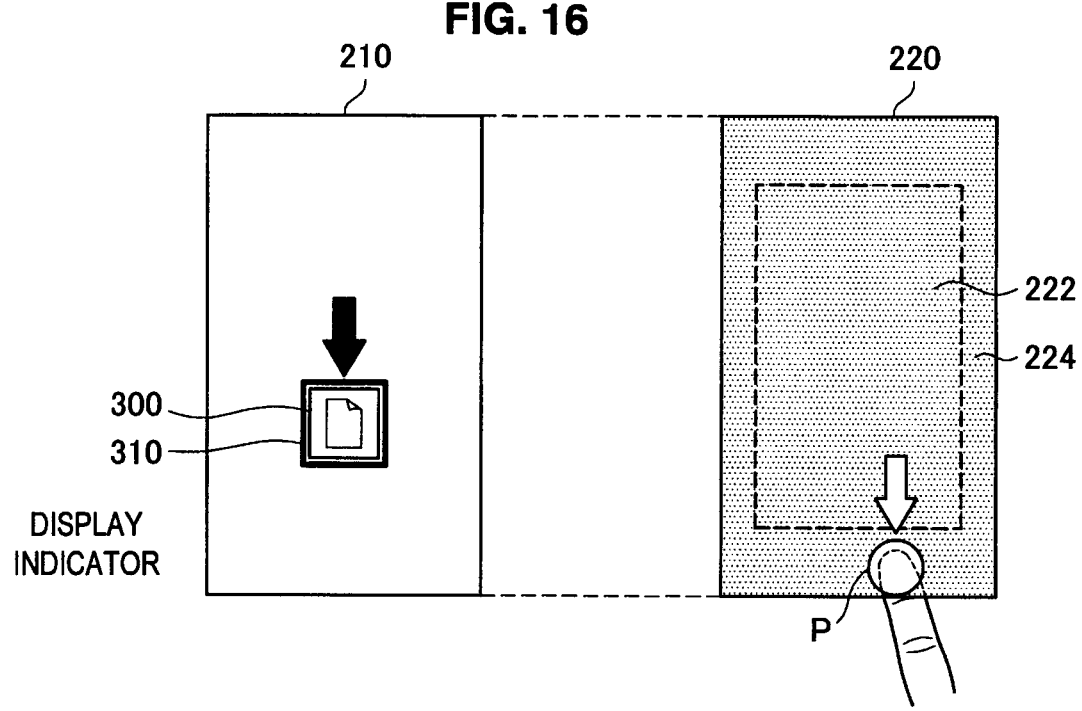
FIG. 16 is an explanatory diagram illustrating still another example of the end point notification expression according to the embodiment.
Figure 19:
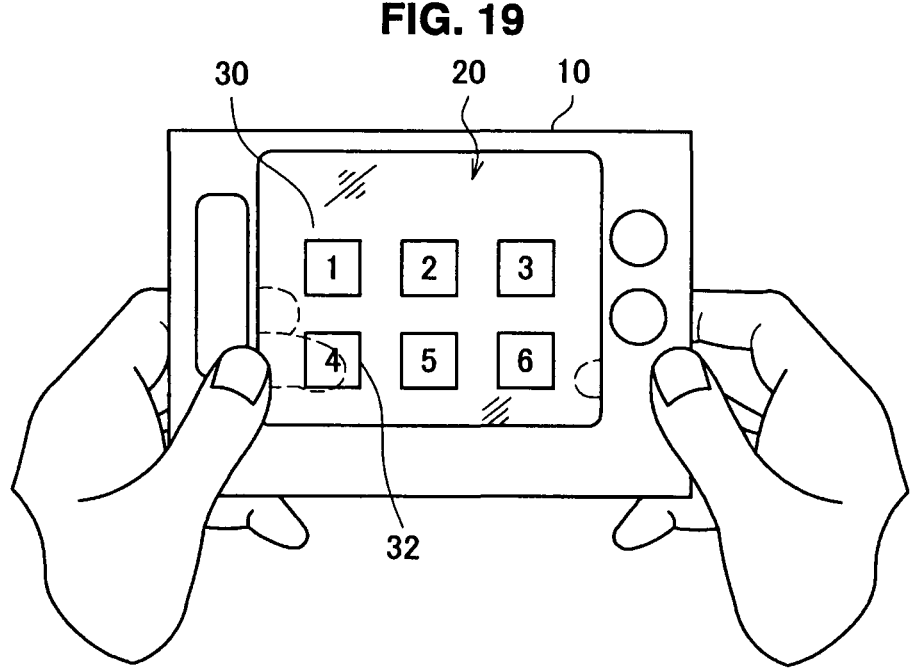
FIG. 19 is an explanatory diagram illustrating a portable terminal apparatus in the related art having a touch sensor on a back surface.

Still another end point notification expression may be displayed as follows. For example, as shown in FIG. 16, when the finger with which the icon 300 of the manipulation target is manipulated moves from the central area 222 of the back surface detection unit 110 into the edge area 224, an indicator 310 serving as an additional object or outlining of the icon may be displayed in the background of the icon 300 of the manipulation target. When the finger moves into the edge area 224, the indicator 310 is displayed, and this allows the user to intuitively recognize that the finger is moving out of the installation region of the back surface detection unit 110.

Still another end point notification expression may be displayed as follows. For example, as shown in FIG. 17, when the finger with which the icon 300 of the manipulation target is manipulated moves from the central area 222 of the back surface detection unit 110 into the edge area 224, the icon 300 of the manipulation target may be displayed in such a manner that the icon 300 is repeatedly enlarged and reduced. As a result, when the finger moves into the edge area 224, the size of the icon 300 starts to change, and this change in the size of the icon 300 allows the user to intuitively recognize that the finger is moving out of the installation region of the back surface detection unit 110.

Still another end point notification expression may be displayed as follows. For example, as shown in FIG. 18, when the finger with which the icon 300 of the manipulation target is manipulated moves from the central area 222 of the back surface detection unit 110 into the edge area 224, a shadow may be displayed at an end portion of the screen of the display surface 210 in the direction in which the icon 300 moves. For example, a shadow whose color becomes darker toward the end of the screen is displayed as shown in FIG. 18. Such shadow is displayed at the end portion of the screen, so that the user can intuitively recognize that the finger is moving out of the installation region of the back surface detection unit 110.

The end point notification expressions of the information processing apparatus 100 according to the present embodiment have been hereinabove explained. According to the present embodiment, when the finger moves from the central area 222 of the back surface detection unit 110 into the edge area 224, for example, the movement or the size of the icon 300 or the display content on the screen is changed for the user so that the user is notified of the finger moving into the edge area 224. At this occasion, the closer the finger approaches the edge of the back surface detection unit 110, the more significantly the end point notification expression may be emphasized. For example, the movement of the icon 300 is increased, or the change in the size of the icon 300 is increased. As a result, the user who is looking at only the display surface 210 can intuitively recognize, in an easy-to-understand manner, that the finger is moving out of the installation region of the back surface detection unit 110.

The embodiments of the present disclosure have been described in detail with reference to the accompanying drawings, but the present disclosure is not limited to such examples. For example, in the above embodiments, the end point notification indicating that the manipulating object is moving out of the installation region of the back surface detection unit 110 is given to the user by means of display on the display surface 210. However, the present technique is not limited such example. For example, notification may be given by vibrating the information processing apparatus 100 itself or notification may be given by means of sound.

In the above first embodiment, the shape of the indicator 212 displayed in response to the touch operation or tap operation is circle. However, the present technique is not limited to such example. For example, the shape of the indicator 212 may be a polygonal shape such as a triangle and a rectangle.

It should be understood by those skilled in the art that various modifications, combinations, sub-combinations and alterations may occur depending on design requirements and other factors insofar as they are within the scope of the appended claims or the equivalents thereof. Also, any reference in the claims to articles, such as "a" or "an," is to be construed as meaning "one or more."

Additionally, the present technology may also be configured as below.

(1) An information processing apparatus including:
a detection unit detecting contact of a manipulating object with a back surface at a side opposite to a display surface displaying information;
a determination unit determining a contact position of the manipulating object detected by the detection unit; and
a notification processing unit notifying a user of a situation that the manipulating object is moving out of a detectable region, in which the detection unit can detect the contact position of the manipulating object, based on a determination result provided by the determination unit.

(2) The information processing apparatus according to (1),
wherein when the manipulating object is determined to be in contact with the back surface, the determination unit determines whether the contact position of the manipulating object is located at an edge area corresponding to an edge portion of the detectable region, and
when the determination unit determines that the contact position of the manipulating object is located in the edge area, the notification processing unit notifies the user of a situation that the manipulating object is moving out of the detectable region.

(3) The information processing apparatus according to (2),
wherein when the manipulating object is determined to be in contact with the back surface, the notification processing unit displays an indicator, on the display surface, indicating a situation of manipulation/input of the manipulating object, and
when the determination unit determines that the contact position of the manipulating object is located in the edge area, the notification processing unit changes a shape of the indicator.

(4) The information processing apparatus according to (3),
wherein when the detection unit detects the manipulating object coming into contact with the back surface, the notification processing unit displays the indicator in a circular shape on the display surface.

(5) The information processing apparatus according to (4),
wherein when the detection unit detects the manipulating object moving on the back surface, the notification processing unit changes the indicator into a shape made by connecting an initial contact position and a current contact position.

(6) The information processing apparatus according to (5),
wherein when the determination unit determines that the contact position of the manipulating object is located in the edge area, the notification processing unit displays the indicator in such a manner that a shape of the indicator is squashed.

(7) The information processing apparatus according to (3),
wherein when the detection unit detects the manipulating object moving from the edge area to outside of the detectable region, the notification processing unit executes animation such that the indicator disappears in a predetermined period of time.

(8) The information processing apparatus according to (7),
wherein when the detection unit detects the manipulating object coming into contact with the back surface within the predetermined period of time since the indicator moves out of the detectable region, the information processing apparatus continuously allows execution of manipulation/input given on the back surface.

(9) The information processing apparatus according to (2),
wherein when the determination unit determines that the contact position of the manipulating object is located in the edge area while an object displayed on the display surface is moved with the manipulating object, the notification processing unit changes movement of the object.

(10) The information processing apparatus according to (2),
wherein when the determination unit determines that the contact position of the manipulating object is located in the edge area while an object displayed on the display surface is moved with the manipulating object, the notification processing unit attaches an additional object to the object and displays the object and the additional object.

(11) The information processing apparatus according to (2),
wherein when the determination unit determines that the contact position of the manipulating object is located in the edge area while an object displayed on the display surface is moved with the manipulating object, the notification processing unit changes a display content on the display surface in a direction in which the manipulating object is moved.

What is claimed is:
1. An apparatus comprising:
a processing unit that obtains position information of an operating member;
an area determination unit that determines an operation area of a back surface of the apparatus based on the position information;
an edge notification unit that generates a first notification to indicate that the operation member has entered into the edge region when the determined operation area corresponds to an edge region of the back surface of the apparatus; and
a display unit that displays an operation indicator on a display provided on a front surface of the apparatus, and also displays the first notification as a graphical indicator on the display provided on the front surface of the apparatus,
wherein the displaying of the operation indicator on the display is modified based on the obtained position information of the operating member when the operating member is detected to be operating upon the back surface,
wherein the first notification is displayed on the display in addition to or in conjunction with the displayed operation indicator,
wherein the operation area is determined within a detection region of the back surface having capability for detecting the operating member, the detection region comprising a central area of the back surface and the edge region, and the edge region being located around the central area,
wherein, when the operating member moves from the edge region to an area outside of the detection region, the edge notification unit generates a second notification to indicate that the operating member is no longer within the detection region and the display unit displays the second notification as the graphical indicator on the display provided on the front surface of the apparatus in addition to or in conjunction with the displayed operation indicator, and
wherein the processing unit, the area determination unit, and the edge notification unit are each implemented via at least one processor.

2. The apparatus of claim 1, wherein the processing unit is configured to obtain the position information by detecting contact between the operating member and the surface.

3. The apparatus of claim 1, wherein the processing unit is configured to obtain the position information by detecting non-contacting proximity of the operating member to the surface.

4. The apparatus of claim 1, comprising an operating unit configured to perform a predetermined operation according to movement of the operating member within the detection region.

5. The apparatus of claim 4, wherein the operating unit is configured to maintain performance of the predetermined operation when the operating member is returned to the detection region within a predetermined time after the operating member is moved to an area of the surface outside of the detection region.

6. The apparatus of claim 1, wherein the display unit is configured to display the graphical indicator at the center of the display.

7. The apparatus of claim 6, wherein the display unit is configured to display a form of the displayed graphical indicator based on the determined operation area of the operating member.

8. The apparatus of claim 6, wherein the display unit is configured to display the graphical indicator at the center of the display regardless of a contacting position of the operating member.

9. The apparatus of claim 1, wherein the edge notification unit is configured to generate the graphical indicator as having a changeable shape based on movement of the operating member.

10. The apparatus of claim 1, comprising a display unit configured to display an icon, the icon being movable based on detected movement of the operating member.

11. The apparatus of claim 10, wherein the edge notification unit is configured to generate at least one of the first notification and the second notification to comprise an emphasizing effect on the icon.

12. The apparatus of claim 11, wherein the emphasizing effect comprises at least one of a rotating effect, a wiggling effect, an outlining effect for outlining the icon, an enlarging effect, and a shrinking effect.

13. The apparatus of claim 1, wherein
when the first notification is displayed, the first notification is displayed on the display in addition to the displayed operation indicator, and
when the second notification is displayed, the second notification is displayed on the display in addition to the displayed operation indicator.

14. The apparatus of claim 1, wherein the first notification is displayed on the display in addition to the displayed operation indicator.

15. A method comprising:
obtaining position information of an operating member;
determining an operation area of a back surface of a device based on the position information;
generating a first notification to indicate that the operation member has entered into an edge region of the back surface of the device, when the determined operation area corresponds to the edge region;
displaying an operation indicator on a display provided on a front surface of the device; and
displaying the first notification as a graphical indicator on the display provided on the front surface of the device,
wherein the displaying of the operation indicator on the display is modified based on the obtained position information of the operating member when the operating member is detected to be operating upon the back surface,
wherein the first notification is displayed on the display in addition to or in conjunction with the displayed operation indicator,
wherein the operation area is determined within a detection region of the back surface having capability for detecting the operating member, the detection region comprising a central area of the back surface and the edge region, and the edge region being located around the central area, and
wherein, when the operating member moves from the edge region to an area outside of the detection region, a second notification is generated to indicate that the operating member is no longer within the detection region and the second notification is displayed as the graphical indicator on the display provided on the front surface of the device in addition to or in conjunction with the displayed operation indicator.

16. A tangibly embodied non-transitory computer-readable storage medium storing instructions which, when executed by a processor, cause a computer to perform a method, comprising:
obtaining position information of an operating member;
determining an operation area of a back surface of a device based on the position information;
generating a first notification to indicate that the operation member has entered into an edge region of the back surface of the device, when the determined operation area corresponds to the edge region;
displaying an operation indicator on a display provided on a front surface of the device; and
displaying the first notification as a graphical indicator on the display provided on the front surface of the device,
wherein the displaying of the operation indicator on the display is modified based on the obtained position information of the operating member when the operating member is detected to be operating upon the back surface,
wherein the first notification is displayed on the display in addition to or in conjunction with the displayed operation indicator,
wherein the operation area is determined within a detection region of the back surface having capability for detecting the operating member, the detection region comprising a central area of the back surface and the edge region, and the edge region being located around the central area, and
wherein, when the operating member moves from the edge region to an area outside of the detection region, a second notification is generated to indicate that the operating member is no longer within the detection region and the second notification is displayed as the graphical indicator on the display provided on the front surface of the device in addition to or in conjunction with the displayed operation indicator.

17. An apparatus comprising:
processing means that obtains position information of an operating member;
area determining means that determines an operation area of a back surface of the apparatus based on the position information;
edge notifying means that generates a first notification to indicate that the operation member has entered into an edge region of the back surface of the apparatus, when the determined operation area corresponds to the edge region; and
display means that displays an operation indicator on a display provided on a front surface of the apparatus, and also displays the first notification as a graphical indicator on the display provided on the front surface of the apparatus, wherein the displaying of the operation indicator on the display is modified based on the obtained position information of the operating member when the operating member is detected to be operating upon the back surface, wherein the first notification is displayed on the display in addition to or in conjunction with the displayed operation indicator, wherein the operation area is determined within a detection region of the back surface having capability for detecting the operating member, the detection region comprising a central area of the back surface and the edge region, and the edge region being located around the central area, wherein, when the operating member moves from the edge region to an area outside of the detection region, the edge notifying means generates a second notification to indicate that the operating member is no longer within the detection region and the display means displays the second notification as the graphical indicator on the display provided on the front surface of the apparatus in addition to or in conjunction with the displayed operation indicator, and wherein the processing means, the area determination means, and the edge notification means are each implemented via at least one processor.

* * * * *